United States Patent [19]

Moyer

[11] Patent Number: 4,865,792
[45] Date of Patent: Sep. 12, 1989

[54] METHOD OF USING COMPOSITE REINFORCED GROMMET

[76] Inventor: James D. Moyer, 301 Woodmont Dr., Downingtown, Pa. 19335

[21] Appl. No.: 153,544

[22] Filed: Feb. 2, 1988

Related U.S. Application Data

[63] Continuation of Ser. No. 61,607, June 22, 1987, abandoned, which is a continuation of Ser. No. 904,854, Oct. 8, 1986, abandoned which is a continuation of Ser. No. 757,057, July 19, 1985, abandoned.

[51] Int. Cl.⁴ .............................................. B29C 65/00
[52] U.S. Cl. ..................................... 264/249; 29/512; 29/522.1; 156/92; 156/293; 264/136; 264/137; 264/257; 411/901; 411/34
[58] Field of Search ................... 29/509, 523, 522 A, 29/526 A; 16/2; 264/249; 156/91, 92, 293; 411/501, 900, 901, 906, 908, 34–38; 249/136, 137, 257

[56] References Cited

U.S. PATENT DOCUMENTS

| | | | |
|---|---|---|---|
| 586,770 | 7/1897 | Kempshall | 16/2 X |
| 1,640,543 | 8/1927 | Gudge | 16/2 |
| 2,510,693 | 6/1950 | Green | 411/906 X |
| 2,584,540 | 2/1952 | Batvin et al. | 16/2 X |
| 4,478,544 | 10/1984 | Strand | 411/901 X |

FOREIGN PATENT DOCUMENTS 6612117 3/1967 Netherlands .................. 264/249

Primary Examiner—Charlie T. Moon

[57] ABSTRACT

A device and method to prevent delamination at load-bearing apertures in structural composite substrates is disclosed. The device is a composite reinforcing grommet having a hollow, generally tubular member of braided filaments impregnated with polymer. The member may be radially deformed for insertion into an aperture in a structural composite substrate and is then capable of being radially expanded to form flanges to secure the structural composite between the flanges. A method of reinforcing a substrate having an aperture therethrough including the step of cobonding a composite reinforcing grommet to a structural composite substrate is also disclosed.

9 Claims, 2 Drawing Sheets

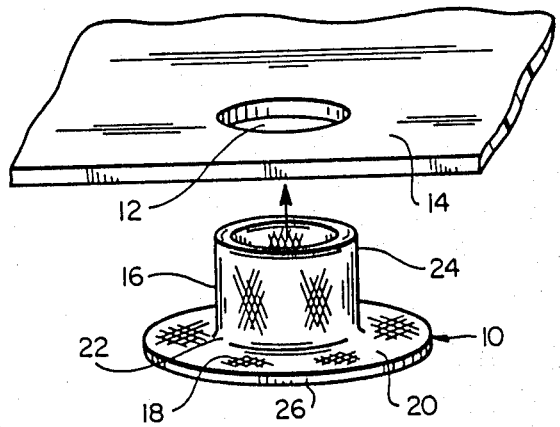
FIG_1
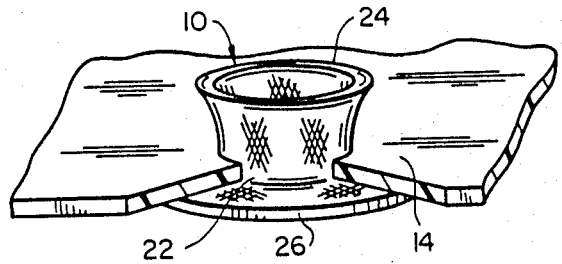
FIG_2
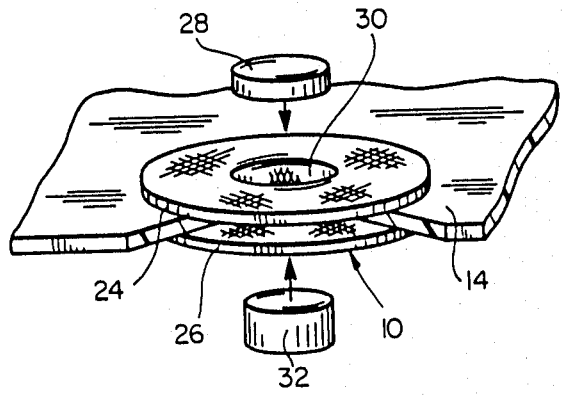
FIG_3

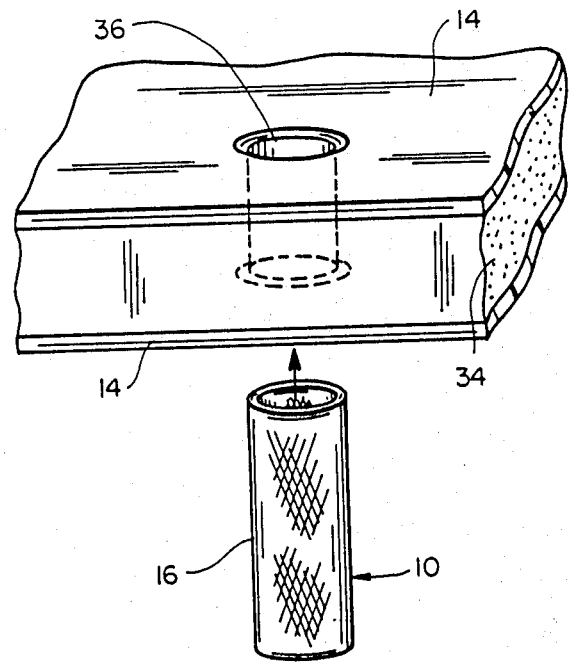
FIG_4
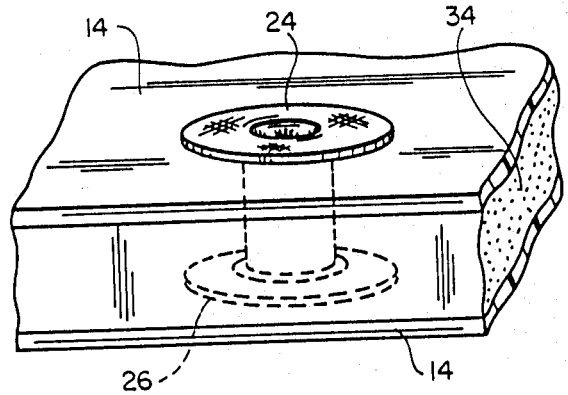
FIG_5

METHOD OF USING COMPOSITE REINFORCED GROMMET

This application is a continuation of application Ser. No. 061,607, filed June 22, 1987, now abandoned, which is a continuation of application Ser. No. 904,854, filed Sept. 8, 1986, now abandoned, which is a continuation of application Ser. No. 757,057, filed July 19, 1985, now abandoned.

BACKGROUND OF THE INVENTION

This invention relates to structural composite laminates and the problem of preventing delamination at load-bearing apertures in such structural components.

The structural integrity of composite laminates is severely compromised when such laminates are drilled or cut such as for purposes of attachment. An aperture in such a laminate tends to especially compromise the axial or Z-axis integrity of the laminate and provides a site for delamination of the composite laminate.

In high-performance applications such as aerospace structures a typical composite may consist of a mat of interwoven high modulus filaments impregnated with a polymer. The drilling of such a laminate to provide an aperture destroys the continuity of the structural filaments contained within the composite. Conventional metal fasteners inserted into such apertures are unsuitable for attachment purposes. The difference in thermal coefficient of expansion of the materials of the composite and the fasteners as well as the differences in hardness will eventually destroy the laminate. The instant invention provides a composite reinforcing grommet of materials similar to that of the composite laminate, thus avoiding thermal expansion problems. Such a grommet is further capable of being co-bonded to the composite material. The polymer impregnated braided filaments of such grommets are capable of being radially expanded to form flanges to secure composite laminates therebetween and thus provide axial or Z-axis integrity. The grommet then provides a suitable attachment mechanism for conventional fasteners.

SUMMARY OF THE INVENTION

The purpose of the instant invention is to provide axial or Z-axis integrity to composite laminates to prevent delamination at load-bearing apertures in such composite laminates. To accomplish this purpose the instant invention provides a composite reinforcing grommet having a hollow generally tubular member of braided filaments impregnated with a polymer, said member capable of being radially deformed when necessary for insertion into a substrate and for subsequent expansion to create flanges outside of such a substrate. Specifically, there is provided a composite reinforcing grommet comprising a hollow generally tubular member braided filaments, said filaments being impregnated with polymer, said member having a central body portion and opposite end portions, said braided filaments allowing said member to be generally radially deformable, said end portions capable of being radially expanded to form flanges to secure a substrate to be reinforced between said flanges.

Another aspect of the invention is a method of reinforcing a substrate having an aperture therethrough comprising the steps of:

providing a composite reinforcing grommet comprising a hollow generally tubular member of braided filaments, said filaments being impregnated with a polymer, said member having a central body portion and opposite end portions, said braided filaments allowing said member to be generally radially deformable, said end portions capable of being radially expanded to form flanges to secure a substrate to be reinforced between said flanges;

providing a substrate having an aperture therethrough;

inserting said member into said aperture; and, expanding the end portions of the member radially outwardly to form flanges, said substrate being secured between said flanges, said aperture being reinforced radially and axially by the grommet.

DESCRIPTION OF THE DRAWING

FIG. 1 is a perspective view of a composite laminate having an aperture therethrough with the composite reinforcing grommet of the instant invention positioned adjacent thereto.

FIG. 2 is a cut-away perspective view as in FIG. 1 after insertion of the grommet into the aperture.

FIG. 3 is a cut-away perspective view as in FIG. 2 wherein the grommet has been inserted through the aperture and the end portions of the grommet have been expanded to form flanges. Also illustrated in this figure is a hole size plug and a locator/size pin which may alternatively be placed within the hollow confines of the grommet during a sizing and/or curing process step.

FIG. 4 is a perspective view of the grommet of the instant invention partially in phantom prior to insertion in a substrate comprising two laminates separated by a core material.

FIG. 5 is a perspective view as in FIG. 4 after flaring of the end portions (in phantom) of the grommet.

DESCRIPTION OF THE PREFERRED EMBODIMENT

With continued reference to the drawing wherein like parts are designated by the same reference numerals, FIG. 1 illustrates the composite reinforcing grommet shown generally at 10 prior to insertion into an aperture 12 in a substrate in the form of composite laminate 14 in the form of a pre-preg laminate. Grommet 10 comprises a hollow generally tubular member 16 of braided filaments 18, said filaments being impregnated with a polymer 20. Grommet 10 may therefore be generally called a pre-preg insert sleeve. In the preferred embodiment of the invention the polymers of the substrate and the grommet are compatable so that the grommet may be preferably co-bonded to the substrate. As used herein the terms grommet and member are used interchangeably.

Included within the concept of generally tubular are configurations for member 16 other than purely cylindrical, such as tapered or convoluted shapes (not shown). These configurations are useful for ease of insertion or for such purposes as temporary location or holding of the member during installation.

Member 16 has a central body portion 22 and opposite end portions 24 and 26. Since the filaments 18 are braided the member 16 is capable of being generally radially deformable. As shown in FIG. 1, end portion 26 has been radially pre-expanded to form a flange which is perpendicular to the longitudinal axis of the member 16. Member 16 is also shown to be slightly larger in diameter than aperture 12 to illustrate that the member 16 may also be radially deformable inwardly for insertion into a smaller diameter aperture 12.

FIG. 1 therefore illustrates the composite reinforcing grommet of the instant invention and the first step of providing reinforcing to a substrate having an aperture therein and providing a grommet.

FIG. 2 illustrates the grommet 10 of the instant invention after insertion into composite laminate 14. This may be accomplished by hand or by the aid of special tools well known to those skilled in the art. As mentioned earlier the grommet may, if necessary, be radially compressed by such tools for insertion into a smaller diameter aperture. A portion of the composite laminate 14 has been cut-away for illustration purposes to show central body portion 22 and end portions 26 and 24. It can be seen that end portion 24 has been partially expanded radially outwardly.

FIG. 2 therefore illustrates a cut-away view of the grommet of the instant invention after insertion into a composite laminate and illustrates the step of insertion of the grommet into the aperture of such a composite laminate.

FIG. 3 illustrates the grommet 10 after it has been inserted through the opening after the end portion 24 has been fully expanded radially outwardly to create a flange generally perpendicular to the axis of the member or grommet which will lie flat against the side of the laminate 14. Likewise, flange 26 lies flat against the other side of the laminate. In order to maintain inside radial dimensions, i.e., accurate hole size of the grommet, a retraining mandrel in the form of a hole size plug 28 may be inserted, as noted, within the hollow confines 30 of the member 16. In the alternative, a locator/size pin 32 may be inserted for purpose of restraining within the member 16. The use of plugs or pins applies especially to embodiments of the instant invention wherein the polymer is a thermosetting material which should be restrained during cure. It is also within the scope of the invention to use a heated tool incorporating a plug or pin when a thermoplastic material is used for the resin 20. FIG. 3 therefore illustrates the grommet of the instant invention after insertion and flanging and specifically the method steps of expanding and co-bonding the end portions of the member against both side of the laminate and of the curing of the polymer of the grommet such as by pressure and/or temperature to co-bond at least the end portions to the laminate. FIG. 3 also illustrates the step of restraining the inside dimension of the member by the use of a mandrel-like member.

FIG. 4 illustrates the grommet of the instant invention when used as a tie-rod or a Z-axis composite hole support. Specifically, the figure illustrates a substrate comprised of two laminates 14 separated by a core 34. A composite reinforcing grommet 10 in the form of a generally tubular member is positioned prior to insertion into the aperture 36 of the substrate. Aperture 36 is preferably a chamfered hole or aperture both for the purpose of guidance and for stress-relieving the composite reinforcing grommet 10 and the laminates.

FIG. 5 illustrates the grommet after installation wherein end portions 24 and 26 (26 shown in phantom line) have been flared to form co-bonding flanges with respect to composite laminates 14.

The composite reinforcing grommet has been described as a tubular member of braided filaments which have been impregnated with polymer and have been generally referred to as a pre-preg braided insert sleeve. By way of example, but not limitation, typical filament materials used for this structure are glass, and high modular materials such as carbon graphite, boron and Kevlar* material. Other filament materials and combinations thereof, either in individual filaments or in braided combined configuration are within the scope of the invention.

Polymers that are used for impregnation of the braided filaments may be either thermosetting or thermoplastic polymers. By way of example, but not limitation, typical polymers include epoxy resins, polyethylene, polypropylene, nylons, etc.

The foregoing detailed description is illustrative of the embodiments of the invention. Variations and modifications will be apparent to those skilled in the art within the scope of the appended claims.

* a trademark of E. I. DuPont de Nemours and Company

What is claimed is:

1. A method of reinforcing a substrate having an aperture therein, comprising the steps of:
    (a) providing a composite reinforcing grommet comprising a hollow generally tubular member of braided filaments, said filaments being impregnated with a polymeric material, said member having a central body portion and opposite end portions, said braided filaments allowing said member to be generally radially deformable, one or both of said end portions capable of being radially expanded to form flanges;
    (b) providing a substrate which comprises a polymeric material and which has an aperture therein;
    (c) inserting said member into said aperture;
    (d) expanding at least one of the end portions of the member radially outward to form a flange which cannot be drawn through said aperture; and
    (e) while the polymeric materials of both the substrate, at least in the vicinity of the apertures, and the grommet are soft, curing the said polymeric materials while applying pressure thereto so that a bond is formed between the substrate and the grommet.

2. A method as claimed in claim 1, in which at least one of the polymeric materials is a thermoplastic material, and the method includes the step of applying heat to the or each thermoplastic material to cause it to soften, after insertion of the tubular member into the aperture, and in which the or each thermoplastic polymeric material is made to cure by cooling below its crystalline temperature.

3. A method as claimed in claim 2, in which the polymeric materials of the substrate, at least in the vicinity of the aperture, and of the grommet, are both thermoplastic materials.

4. A method as claimed in claim 1, in which at least one of the polymeric materials is a thermosetting material.

5. A method as claimed in claim 4, which includes the step of applying heat to the or each thermosetting polymeric material to cause it to cure.

6. A method as claimed in claim 1, which includes the step of supporting the internal surface of the tubular member to control deformation thereof during formation of the flange.

7. A method as claimed in claim 1, in which one of the end portions of the tubular member is expanded prior to insertion of the tubular member into the aperture.

8. A method as claimed in claim 1, in which more than one of the end portions of the tubular member is expanded outwardly so as to form flanges which cannot be drawn through said aperture, the substrate being restrained between two flanges.

9. A method as claimed in claim 1, in which the tubular member is inserted in registered apertures in two such substrates so as to join the substrates to one another after the polymeric materials have cured.

* * * * *